United States Patent

[11] 3,612,753

[72] Inventor Nathaniel I. Korman
Princeton, N.J.

[21] Appl. No. 818,489
[22] Filed Apr. 23, 1969
[45] Patented Oct. 12, 1971
[73] Assignee Ventures Research & Development Group
Princeton, N.J.

[54] SELF-ADAPTIVE SYSTEM FOR THE REPRODUCTION OF COLOR
17 Claims, 16 Drawing Figs.

[52] U.S. Cl. .......... 178/5.2 A, 178/5.4
[51] Int. Cl. .......... H04n 9/02
[50] Field of Search .......... 178/5.2, 5.2 A, 5.4; 355/88

[56] References Cited

UNITED STATES PATENTS

| | | | |
|---|---|---|---|
| 2,434,561 | 1/1948 | Hardy et al. .......... | 178/5.2 A |
| 2,879,326 | 3/1959 | Yule .......... | 178/5.4 |

*Primary Examiner*—Richard Murray
*Attorney*—Ostrolenk, Faber, Gerb & Soffen

ABSTRACT: A method and apparatus for the production of color pictures, especially of the "half-tone" variety wherein the color fidelity of the reproduction matches that of the original picture or transparency from which the reproduction is produced. Initial printing plates are produced for printing a color standard which contains every one of a large plurality of arbitrary color patches. The same ink, paper, printing plates and printing process are used to prepare the matrix as will be used in the final production process. The printed matrix is then point-by-point scanned for correlating the original color data with the colors of the printed result so as to fully take account of the characteristics of the ink, paper, plates and printing process. The modified color information is then utilized in the reproduction process during which the picture to be reproduced is scanned point-by-point to determine its tristimulus values (red, green and blue). The color data previously developed operates on the tristimulus values and the color information to determine what excitation is needed for each tristimulus value to sensitize the corresponding points on each of the color printing plates to be used in the reproduction process.

INVENTOR.
NATHANIEL I. KORMAN
BY
OSTROLENK, FABER, GERB & SOFFEN
ATTORNEYS

INVENTOR.
NATHANIEL I. KORMAN

BY

OSTROLENK, FABER, GERB & SOFFEN
ATTORNEYS

INVENTOR.
NATHANIEL I. KORMAN
BY
OSTROLENK, FABER, GERB & SOFFEN
ATTORNEYS

INVENTOR.
NATHANIEL I. KORMAN
BY
OSTROLENK, FABER, GERB & SOFFEN
ATTORNEYS

SELF-ADAPTIVE SYSTEM FOR THE REPRODUCTION OF COLOR

The present invention relates to the graphic arts field and more particularly to a novel self-adaptive method and apparatus for producing color pictures having excellent color fidelity as compared with the original picture or transparency which is being reproduced through the employment of a technique which modifies measured tristimulus values of the original picture or transparency through the use of data which represents the characteristics of the inks, paper and printing process employed in the final production process to produce a nondistorted version of the original.

Color reproduction systems, be they photographic, electronic or the type in which ink is printed on a paper surface, generally suffer from a number of defects which tend to yield a distorted version of the original print or transparency. The human eye is actually quite tolerant of many forms of distortion and, in fact, can utilize some controlled distortion advantageously to compensate for certain psychophysical effects. Nevertheless, a very considerable amount of ingenuity, elaborate and expensive equipment and skilled labor is normally required to compensate for the deficiencies inherent in conventional reproduction techniques.

The present invention is directed to a system for printing colored inks on paper through the use of a method which accurately reproduces original scenes captured in two-dimensional form by an artist or photographer. Before consideration of the method and apparatus of the present invention a brief description will be given of some of the ways in which distortion occurs in conventional systems.

One type of distortion results from the fact that the spectral quality of the inks used in the reproduction process do not match that of the color filters used to break down the scene into its three color components. It is an established fact that any color can be matched by an appropriate combination of three substantially pure colored lights (red, green and blue). Thus, ideally, if a color is analyzed through red, green and blue filters and then red, green and blue absorbing inks are laid down upon the paper in the proportion indicated by the analysis, the original color should be reproduced exactly by the inks. As a practical matter, however, since it is not possible to obtain inks and color filters which match each other with sufficient exactness, the color match is made by taking an appropriate linear combination of the color filter outputs for the determination of the amount of each ink. This technique is typically referred to as masking.

Another source of distortion arises from the nonlinear effects normally associated with the behavior of the inks, photographic processes and printing plates employed in the reproduction process. A small patch of ink of constant thickness and variable surface area produces a color intensity which is linearly related to the size of the surface area covered. However, if the ink patch has a variable thickness, or if an ink patch of one color overlays another, the resulting color becomes exponentially related to thickness causing a significant departure from the otherwise linear relationship. Other significant deviations from linearity arise from the photomechanical processes used in fabricating the printing plates.

Further elaboration of the sources of distortion are unnecessary when using the system of the present invention which, in effect, measures the overall results and compensates for system distortions with one all-encompassing method.

The self-adaptive method and system of the present invention initially generates a large number of arbitrarily selected but nevertheless representative sets of colors wherein each set is comprised of arbitrary values representing the proportion of the cyan, magenta, yellow and black inks included in each arbitrary color set. In order to obtain excellent color reproduction, a large number, on the order of 500 sets, are generated. Having obtained a large set of arbitrary colors more or less evenly spaced in CMY (cyan, magenta, yellow) space a set of plates is then produced to print these arbitrary color patches. Each plate lays down one of the colored inks upon a paper to produce a matrix comprised of a large number of blocks arranged in a regular row and column fashion over the entire surface area which is more or less equal in size to the final picture to be produced. The color patches in each small block are on the order of ¼ to ½ inch in size but of different colors, depending upon the proportion of each color ink used to produce the matrix.

The printed matrix is then placed in a scanner and subjected to point-by-point scanning with a technique which scans in the order of 20,000 points per square inch. Thus, each small block of the matrix print will contain a large number of scanning points.

The ink proportions for each cyan, magenta, yellow and black set is measured and stored in the memory of a computer. Measurements of the proportion of red, green and blue for each cyan, magenta, yellow, black color set are averaged by spreading the scanning beam diameter to several times normal diameter in order to obtain smooth data and minimize dot alignment and moire effects. Also, a large number of independent measurements are made and are then numerically averaged. Thus, for each cyan, magenta, yellow, black color set there is associated an average value of red, green, blue. These corresponding sets are stored in preselected locations of computer memory. From this information the coefficients are calculated for a predetermined set of color conversion equations which facilitate conversion of any set of measured color values into the corresponding amounts of color inks to reproduce that color. The sets of coefficients of the color conversion equations are then stored in preselected locations of a computer memory. The system is now ready to produce color-separation halftone plates from original continuous-tone material.

To produce the plates for use in the final production printing operation the scanning device of the system scans the picture (or transparency) to be reproduced on a point-by-point basis to determine the tristimulus values (red, green and blue) for each point. Using the coefficients of the color equations, the calculation is made for each point to determine from the coefficient data stored in memory what excitation is needed for that particular tristimulus value to sensitize the corresponding points on each of the color printing plates to be used in the reproduction process.

A variety of different techniques may be employed for the purpose of forming the final printing plates. In one preferred embodiment, the plates for laying down the cyan, magenta, yellow and black inks may be formed simultaneously with the scanning process by means of an engraving system which engraves the plates at points which correspond to the point just evaluated on the transparency or picture. In another preferred embodiment, transparent plates having an opaque coating may be engraved in a somewhat similar fashion to produce points on each plate of varying light transmissivity. These plates may then be used to prepare the final printing plates through conventional photographic techniques. Still another alternative embodiment which may be employed is that of exposing light sensitive plates at points corresponding to the point examined on the original print or transparency by a light beam of varying intensity, time duration and/or beam width. The light sensitive emulsion is then developed through photographic techniques to form the final printing plates which are then used to lay down the same inks employed to print the color matrix.

The success of the present system in exactly reproducing the original picture or transparency is limited only the stability of the various steps inherent in the process and by the errors which may crop up in interpolating among the color patches. The former is common to all color printed processes, however, the self-adaptive system not only introduces no new sources of instability but rather acts to counter or compensate for many of the existing sources of imprecision. The latter can be made vanishingly small by employing a sufficiently large number of color patches.

It is therefore one object of the present invention to provide a novel method and apparatus for producing reproductions of original color pictures, transparencies and the like wherein the fidelity of reproduction is obtained by taking fully into account all of the characteristics of the photographic processes, inks, printing process and paper employed in the reproduction process.

Still another object of the present invention is to provide a novel method and apparatus for producing color reproductions of original prints, transparencies and the like to obtain excellent color matching between the original and the color reproduction by calculating all of the coefficients of the color conversion equations specifying the inks, reproduction process and paper to be used in making the final reproductions prior to preparation of the printing plates, enabling substantially the exact proportions of each ink to be determined therefrom during the scanning of the original, and simultaneous formation of the printing plates.

These, as well as other objects of the present invention, will become apparent when reading the accompanying description and drawings in which.

Figure 2:
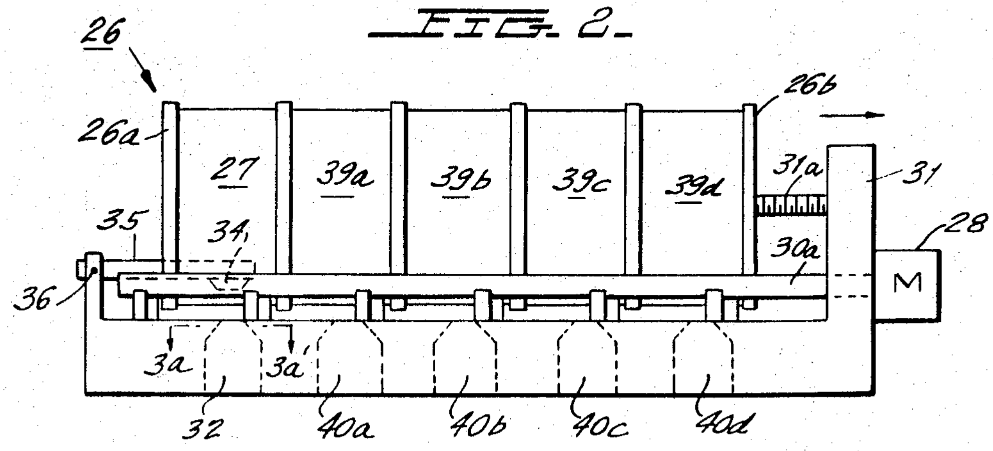
FIG. 2 shows an elevational view of still another preferred embodiment of the present invention.
Figure 2A:
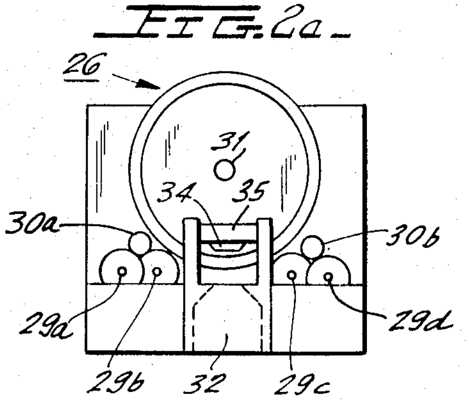

FIG. 2*a* shows an end view of the embodiment of FIG. 2.

Figure 1:
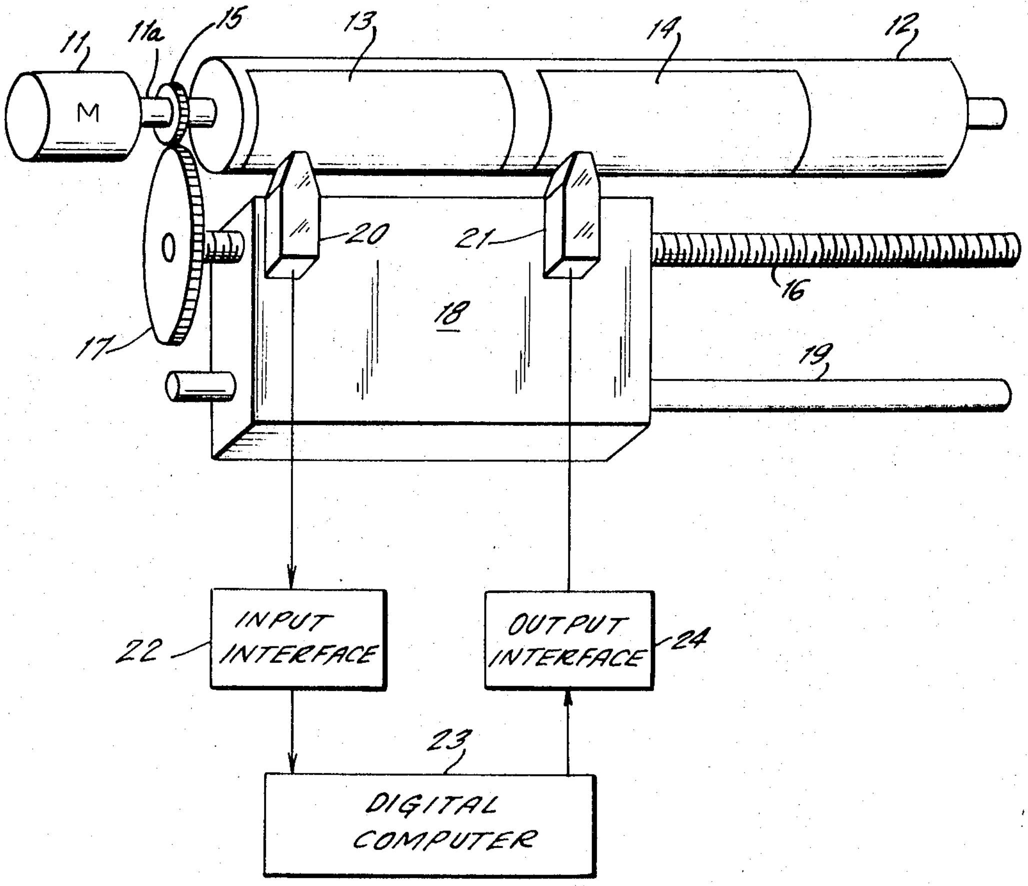
FIG. 1 shows a perspective view of one embodiment of the present invention.

FIGS. 3*a*–3*d* show scanning devices which may be employed in either of the embodiments of FIGS. 1 or 2.

Figure 4:
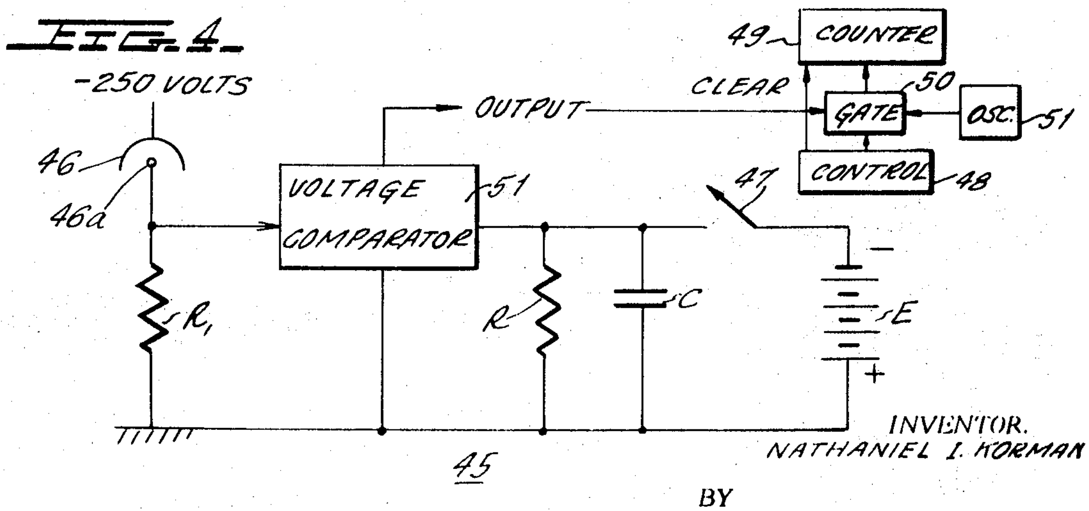

FIG. 4 is a schematic diagram of a circuit which may be employed for converting light intensities sensed by the scanner photocells into the representative electrical signal.

Figure 5:
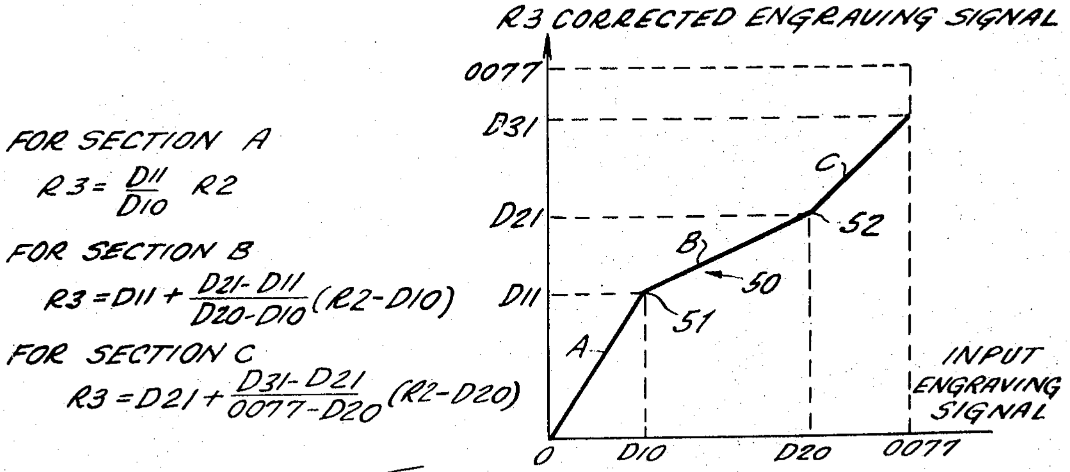

FIG. 5 is a graph showing a gamma correction curve.

Figure 6A:
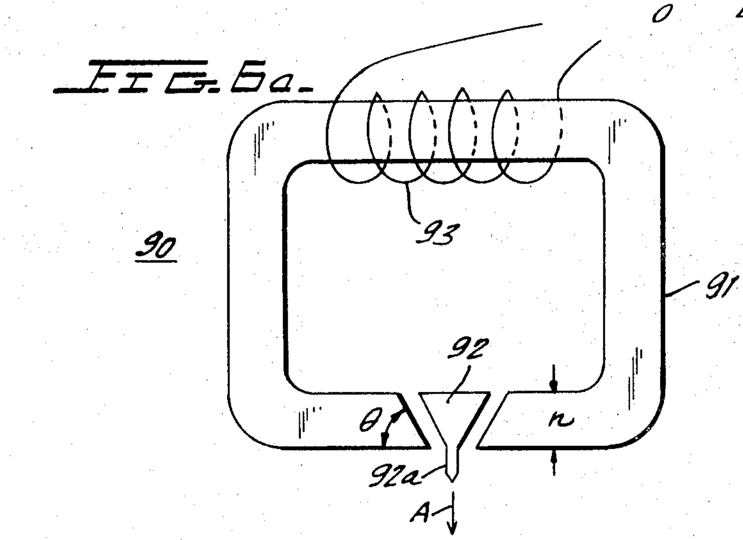
Figure 6B:
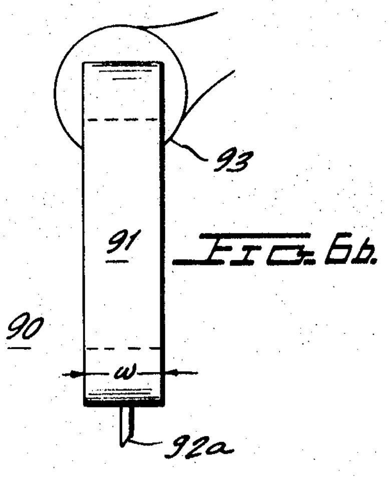

FIGS. 6*a* and 6*b* are front and end views respectively of a cutting assembly which may be employed with either of the systems shown in FIGS. 1 and 2.

Figures 7, 7A:
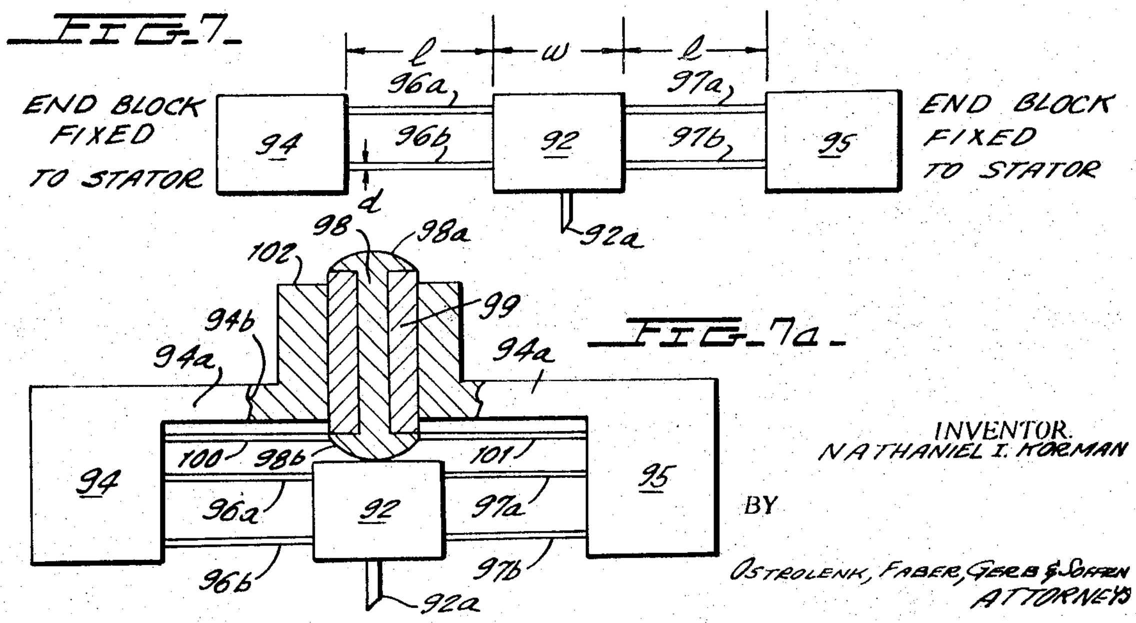

FIG. 7*a* is an elevational view of a spring mounting system for resiliently mounting the cutter of FIGS. 6*a* and 6*b*.

FIG. 7*b* is an elevational view, partially sectionalized, showing a snubber assembly which may be employed with the cutter of FIGS. 6*a* and 6*b*.

Figure 8:
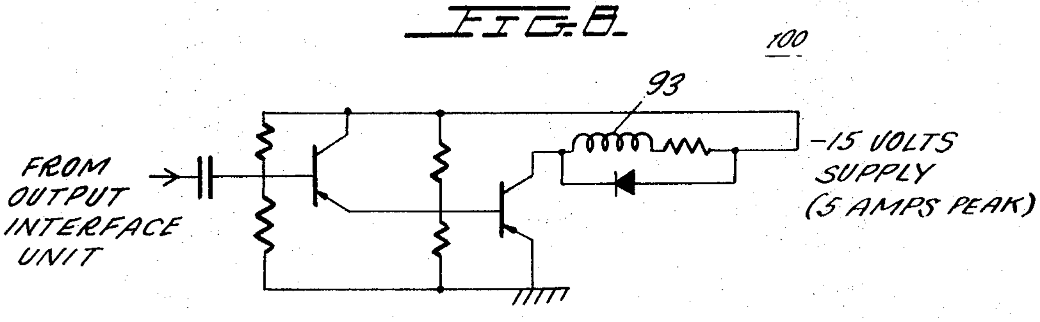

FIG. 8 is a schematic diagram showing the circuit which may be employed to activate the cutter assembly of FIGS. 6*a* and 6*b*.

Figure 9:
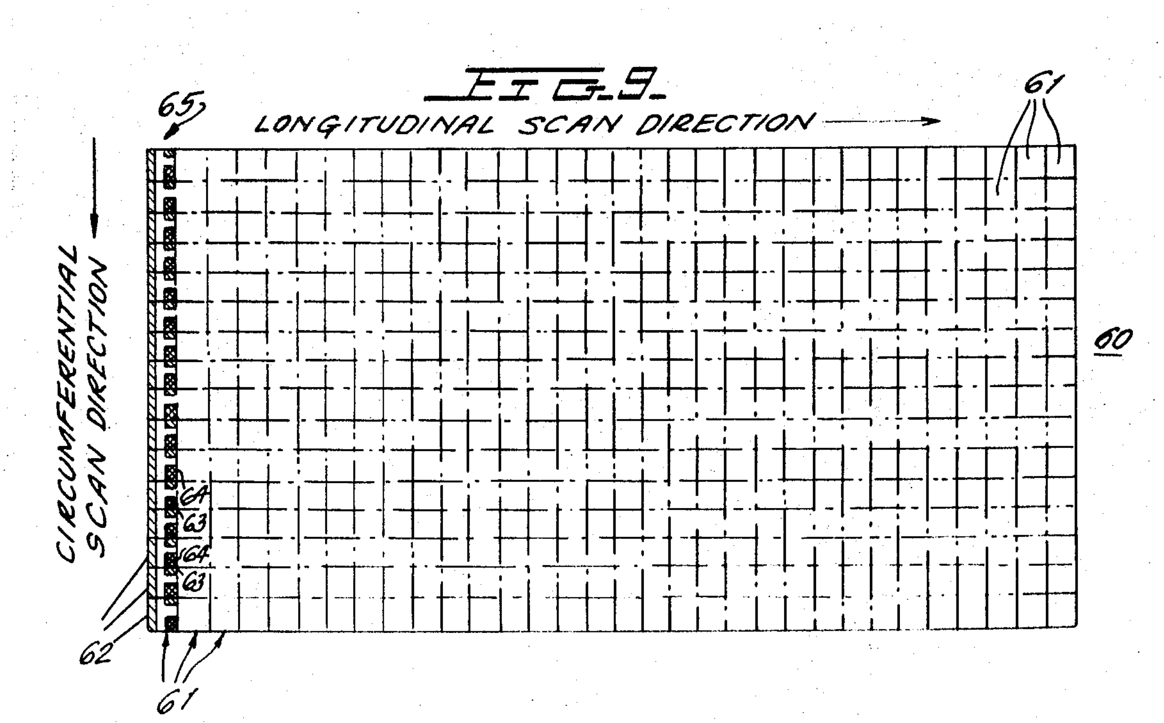

FIG. 9 is a plan view of the color array employed to derive the color matrix used to develop the appropriate coefficients of the color conversion equations.

Figure 9A:
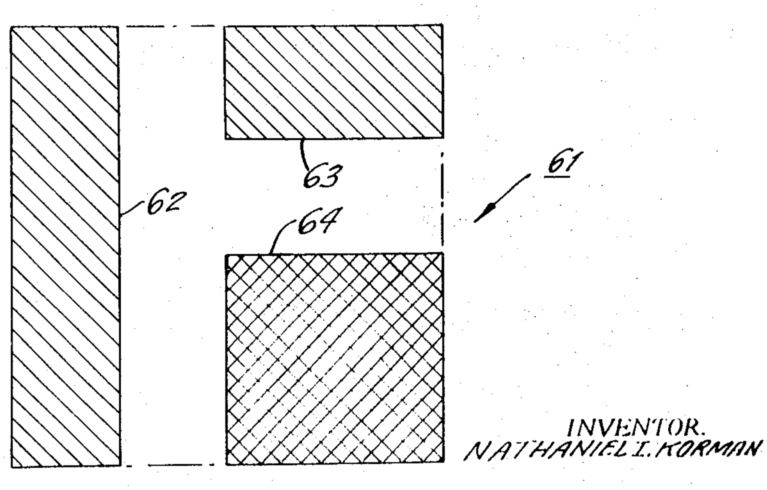

FIG. 9*a* shows the arrangement of one typical color patch provided in each block of the color array shown in FIG. 8.

The present invention may be used for providing a new method and apparatus for fabricating printing plates which may be utilized in the gravure or intaglio method of printing. Conventional gravure printing techniques typically employ a metallic cylinder having tiny pits etched into its surface. The pits are of the order of several thousandths of an inch in diameter and in depth. In printing, the cylinder rotates so that its surface dips into a well of printing ink whereby the pits, as well as the cylinder surface, become charged with ink. Immediately after the surface of the cylinder emerges from the inkwell, a blade (typically referred to as a doctor blade) wipes the ink from the surface, leaving the ink only in the etched pits. The paper sheet, generally fed continuously from a large roll, is pressed against the cylindrical surface. At the point of contact between the cylinder and the paper, most of the ink transfers from the etched pits to the paper yielding the desired reproduction after drying.

The intaglio method of printing has proved to be the least critical printing process. In particular, the control of the inking process is far simpler than in other printing processes, the life of the printing surface runs to many millions of copies and equals or exceeds that of any other known printing process. The printing quality is considered to be excellent and the printing speeds exceed those of other printing processes.

In the present invention, it is proposed that "half-tone" outputs be generated directly from the original continuous tone picture for formation of the printing plates; this minimizes the system operating cost per picture. A halftone picture is one in which the details of the image are reproduced in the form of closely spaced dots; the dots in the darker areas appear as large in size whereas the dots in the lighter areas are smaller. Thus the entire picture area is broken up into cells whose sizes are typically of the order of 0.007 inch. Within each cell a black dot, or in the case of color, magenta, cyan, yellow and black dots, are printed. The size of the dots, relative to the area of the cell in which the dots are printed, is determined by the density of the picture in the area of the particular cell. FIG. 1 shows a system 10 which may be employed for engraving the halftone printing plates used in the final reproduction process. The system is comprised of a motor 11 having an output shaft **11*a* directly coupled to a drum 12 which is rotated at a constant speed. A sheet 13 which may be an original picture or text, or both, is securely attached to the surface of drum 12 by mechanical clamps or by a vacuum system (neither of which have been shown for purposes of simplicity). Similarly, a sheet 14 of metal is secured to the surface of drum 12 in a like manner. The picture on sheet 13 ma be in monochrome or in color. A gear 15, provided on shaft 11*a* drives a lead screw 16 by means of a coupling gear 17 secured thereto. A carriage 18, which threadedly engages lead screw 16 is transported along a straight line parallel to the axis of the rotating drum. A bearing shaft 19 serves to maintain carriage 18 in proper alignment with the longitudinal axis of drum 12. Thus, as the drum 12 rotates, the carriage 18 is caused to move linearly from left to right. A picture pickup assembly 20 and an engraving head assembly 21 are both secured to carriage 18**.

The picture pickup assembly 20 is comprised of a light source and a set of three photocells and color filters (to be more fully described hereinbelow) which serve to examine the original picture in a point-by-point manner and thus determine the three color parameters of each point. Obviously, for monochrome, only one photo cell would be required.

The engraving head assembly 21 is provided for cutting a pit in the material 14 which ultimately will become the printing plate.

The picture pickup photocells are connected to a digital computer through interface equipment 22. The cycle of events which are carried out to form the engraved spot are as follows:

The computer indicates readiness to receive new data from the picture pickup photocells. The input interface equipment converts the three-color parameters of the picture spot then under examination into digital form and temporarily stores this data. The computer 23 is then notified that new data is available. This data, as well as the data identifying the color of the plate now being engraved, is ingested by the computer. The computer goes into a routine which determines the depth of the pit to be engraved and delivers signals in digital form to the output interface device 24 which converts the digital signal to an electrical impulse of the proper magnitude and form to drive the engraving head which cuts or engraves a pit of the proper size in the plate material.

The system herein described may also be used with a novel and improved printing method which we will call "resilient intaglio printing". Resilient intaglio printing resembles the hereinbefore described conventional gravure or intaglio printing in that it uses a printing plate containing tiny pits in its surface. However, it differs materially in that the printing plate is made of a resilient plastic or rubber material. Printing is accomplished by transferring the ink in the pits of the plate to the paper by squeezing the paper between a metallic cylinder, known as an impression cylinder, and the printing ink carrier cylinder. Enough pressure is applied between these two cylinders so that the deformation of the printing ink carrier is of the same order as the depth of the pits. Because of this deformation the ink is forced to flow out of the pits and onto the surface of the paper as well as into its pores. By rotating the impression and printing ink carrier cylinders so that they roll on each other the ink in the pits of the printing ink carrier can be constantly replenished and the paper which is fed between the cylinders from a roll, or as a succession of individual sheets from a stack of sheets, will be imprinted continuously at a rate depending on the speed of rotation of the cylinders.

Since the strengths of resilient plastic materials range from 1,500 pounds per square inch for polyethylene to 12,000 pounds per square inch for nylon, the pressure between the impression and the printing ink carrier cylinders will have to be kept well below the point at which permanent deformation would take place. For nylon, for instance, the pressure might be on the order of 1,000 pounds per square inch. Since the modulus of elasticity of nylon is on the order of 100,000 pounds per square inch the elastic deformation of a printing ink carrier of nylon 0.10 inches thick at a pressure of a 1000 pounds per square inch would be on the order of 0.001 inches. This deformation is on the same order as the depth of the pits and yet is well within the elastic limits of the material.

The method of printing described differs materially from the known methods of printing. Rotogravure printing, for instance, utilizes pits engraved in a metallic material such as copper, as ink carriers. While ink is applied to the printing ink carrier substantially as described earlier, the mechanism for transferring the ink from the printing ink carrier to the paper is entirely different. Since metals such as copper have moduli of elasticity, or stiffnesses, about 200 times as great as those of resilient plastics and strengths less than 10 times as great, an elastic deformation on the order of the pit depth of 0.001 inches is not possible. The ink from a rotogravure printing ink carrier therefore cannot be forced out of the pits by elastic deformation of the printing ink carrier. Instead the impression cylinder is made of a resilient material such as rubber and an attempt is made to force the paper into the pits. Since the modulus of elasticity, or stiffness, of the cellulose fibers of which paper is composed is on the order of 10 times as great as that of typical plastics and the strength is less than one-tenth, it is difficult to make the paper move very far into the pits without excessive force and deformation. In addition, the forces of surface tension which also help to make the ink flow from the pits onto the paper are extremely low; on the order of 1.0 pounds per square inch. The net result is that in rotogravure printing problems associated with ink flow from the etched pits onto the paper surface cause difficulties which should be greatly ameliorated if not eliminated by the novel printing process described hereinbefore. This improvement becomes most significant where very fine dots are used to obtain high fidelity of reproduction.

The system may be used with other conventional printing methods. For example, if the material which is engraved is composed of a transparent plastic having a thin opaque surface coating, the result of the engraving process described hereinabove will be an opaque film with transparent holes. The hole sizes are determined by the depth penetration of the engraving head (which has a tapered cutting point). This resulting sheet can be used directly in place of the conventional "screened" photographic film to form lithographic-offset, letterpress or intaglio-printing plates.

Alternatively, if the engraving head is replaced by a pulsed light source which is modulated in intensity or pulse length from one pulse to the next or by a cathode-ray tube light source which is pulsed in time and whose beam diameter is modulated in size from one pulse to the next, and the engraving material is replaced by a photographic film, the resultant exposed film can then be developed and used in place of the conventional "halftone exposed" film to form lithographic-offset, letterpress or intaglio-printing plates.

Extensive experience with the halftone method of printing has shown that the halftone grid, because of the periodic spacing of its elements, can give rise to a distracting effect known as moire if the spacing period closely coincides with some periodic element in the picture. For monochrome pictures it has been found that the occurrence of such periodic elements are rare and the effect of even these can be minimized by inclining the grid dot pattern at an angle of 45° relative to the edges of the picture. For color pictures it has been found that severe moire can occur because of the interference between the grid patterns used for the various colors. The usual practice to avoid moire in color printing is to align the grids at various angles with respect to each other. It has been found that if the black grid is aligned at 45° relative to the edges of the picture, the cyan and magenta at +30° and −30° respectively, from the black and the yellow at an angle of 45° relative to the black, moire effects are thereby minimized.

The effectiveness of this rotation arises from the fact that the dot spacing on any one grid will, when projected upon another grid, have a periodic spacing which is far removed from the spacing of the other grid. For instance, when two grids with equal spacings which are inclined at an angle of 45° to one another are projected one on the other, the ratio of dot spacing along the directions of either grid will be 1:1.4. This will give rise to a moire frequency which is 40 percent of the dot spacing frequency. When the two grids have equal spacings but are inclined at an angle of 30° to each other the dot spacings of one grid projected upon the other will bear ratios of 1:2 and 1:1.7, in the two directions respectively. These produce moire frequencies of 100 percent and 70 percent of the dot spacing frequency. High moire frequencies such as these are not nearly as visible and annoying as lower frequencies.

For the system described hereinabove there are still more convenient and more powerful methods of avoiding moire. One of these is to use a random element in the spacing of the dots. This is easily performed by introducing a random delay in the computer program which will result in a random spacing of the dots in the direction of rotation of the drum. In addition, if necessary, incommensurable dot spacing along the axis of the drum for the different colors can be accomplished by varying the drive ratio of the lead screw. To achieve this result, the gear drive illustrated in FIG. 1 may be replaced by a wheel and disc drive or some other drive whose ratio is infinitesimally adjustable.

In the alternative method described above, wherein a cathode-ray tube is used to expose photographic film in place of the electromechanical engraving head, the random dot spacing may be achieved most conveniently by random deflections of the cathode-ray tube spot. These deflections can be made to occur in both the drum circumferential and longitudinal directions.

FIGS. *2a–3c* show another preferred embodiment of the present invention in which all color plates may be engraved or otherwise produced simultaneously. In the embodiment of FIG. 1 only a single plate is engraved or otherwise formed during a single scanning of the picture. The system of FIG. 1 may be employed to reproduce color reproductions by scanning the original picture one color at a time and therefore, although more time consuming, would be a less expensive technique as compared with the system of FIGS. **2*a*–3*b***.

As shown in FIGS. 2 and **2*a*, the system 25 is comprised of a cylinder 26. The picture to be scanned is mounted on the cylinder at location 27. The picture may be in the form of a transparency, in which case a transparent cylinder must be used and the transmission of light through the picture is measured, or the picture may be on a substantially opaque substrate in which case the reflection from the surface is measured. The cylinder is rotated by means of a motor 28 which is mechanically coupled, by means not shown for purposes of simplicity, to driving roller 30*a* and 30*b* which are journaled within suitable bearings (not shown) at their right-hand end in machine frame 31 and are supported along their length by a plurality of sets of rollers 29*a*–29*b* and 29*c*–29*d* which sets are arranged at spaced intervals along the length of driving rollers 30*a* and 30*b*. The cylinder is caused to rotate by means of frictional contact with the small diameter rollers 30*a* and 30*b*. In order to prevent abrasion of the picture by the rollers the cylinder diameter is increased slightly at its ends 26*a* and 26*b*** so that only the larger diameter end sections of the cylinder make contact with the rollers 30*a* and 30*b*. Various diameter cylinders can be used to accommodate a variety of picture sizes since the roller drive insures constant surface velocity independent of cylinder diameter. The surface velocity is determined by the halftone cell size and the time necessary to process the signal for one cell. The cylinder is caused to advance by one cell length for each revolution of the cylinder lead screw 31*a* which is suitably mechanically coupled to the output shaft of motor 28 (by means not shown) and which is colinear with the cylinder longitudinal axis to support the cylinder and to connect it to the machine frame 31.

A phototube-filter assembly 32 is resiliently mounted to machine frame 31 so that it can "ride" upon the surface of the cylinder during the performance of the point-by-point examination of the transparency (or opaque picture).

Figure 3A:
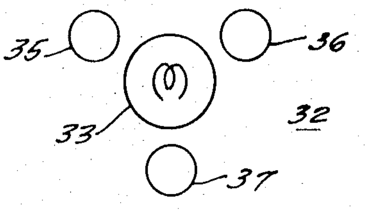

The phototube-filter assembly 32 is shown in greater detail in FIG. 3*a* and is comprised of an integral light source 33 for scanning opaque pictures. In the case where transparencies are to be scanned another light source 34 is secured upon an arm 35 resiliently mounted at 36 to machine frame 31 so that it can "ride" on the inside surface of the transparent cylinder. FIG. 3*a* shows a front view of the phototube-filter assembly looking in the direction of arrows 3*a*–3*a'* in FIG. 2. It can be seen that the filter-photocell assemblies for each of the three primary colors (usually, red, green and blue) are spaced at substantially equal intervals (of the order of 120°) about the light source and lens assembly 33.

Figure 3C:
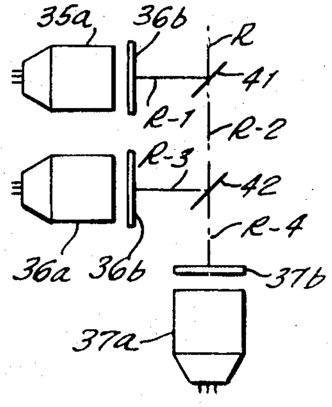
Figure 3D:
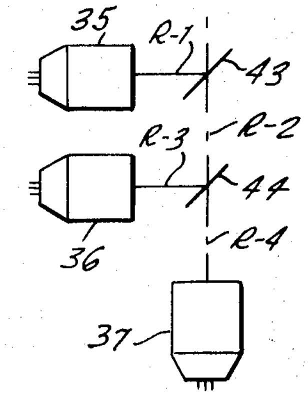
Figure 3B:
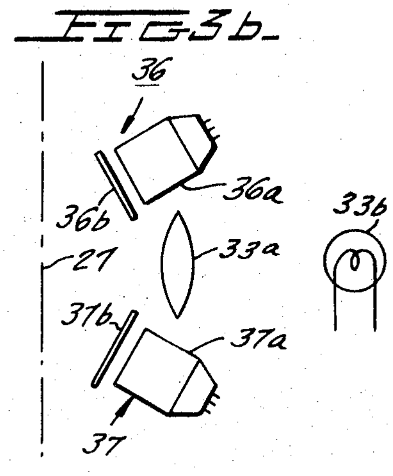

FIG. 3*b* shows an end view of the assembly of FIG. 3*a* with the lens system 33*a* being positioned between light source 33*b* and the image surface of (opaque) picture 27. Only two of the three filter-photocell assemblies are shown in FIG. 3*b*, namely, assemblies 36 and 37. Assembly 36 is comprised of a light sensitive photocell 36*a* and a color filter 36*b* positioned between the image surface of the picture 27 and the light sensitive photocell 36*a*. The structure of filter-photocell assembly 37 is substantially identical except for the fact that a filter of a different color would be provided for each of the filter-photocell assemblies. Light emitted from the light source 33*b* is focused by the lens system 33*a*upon the image surface of the picture 27. Reflected light from the point on the surface being illuminated impinges on each of the color filters which pass only one of the three primary colors to their associated light sensitive photocells which generates a signal for that particular color having a magnitude which represents the intensity of that particular color. The lens is provided with an adjustable focus for producing desired adjustments in cell size. Of course the light source 33*b* need not be illuminated when scanning transparencies and alternatively the light source 34 may be illuminated to enable the photocells to pick up light passing through the transparency which, in turn, impinges upon each of the different color filters to generate signals of magnitudes representative of the intensity of each primary color present at the spot being scanned.

An extension of the cylinder 26, which need not be transparent, carries the output substrates which are arranged at locations 39*a*–39*d* along the cylinder. The output substrate can be a photographic film which, after exposure by a modulated light source 40*a*–40*d* respectively, may then be developed and subsequently used in conjunction with conventional techniques to make the final printing plates. Alternatively, the output substrate may comprise a transparent plastic film with a thin opaque coating. In this particular embodiment mechanical cutting tools may be used in place of the modulated light sources to engrave pits of variable depth and width into the plastic film. The tool would preferably have a triangular shape and thus cut away more or less of the opaque coating, depending upon the magnitude of the excitation signal received from the computer which converts the intensity information for each color at each point being scanned into signals which control the depth of corresponding pits on each of the printing plates. Four substrates are provided for each of the colors cyan, magenta and yellow as well as black which, when combined in appropriate proportions, reproduce the color of the point of the original picture (or transparency) being scanned. The transparent plastic film with its opaque surface removed to a greater or lesser extent at each of the cell locations can then be used to make printing plates in the same way as the photographic film described above. As a further alternative, the output substrate is engraved as described above and can be used directly as a printing plate for the final reproduction process.

As was described above, the original picture (or transparency) is scanned to develop signals for each point scanned which are proportional to the red, green and blue densities. Density is defined as the logarithm of the reciprocal of the amount of light reflected from an opaque copy or transmitted through a transparency. The use of red, green and blue primaries instead of some other set of primaries and the use of signals proportional to density, rather than for instance proportional to light reflectance, is not mandatory for the system described herein. It is also possible that a choice of a different set of primaries might lead to color equation parameters which are all nonnegative. This would simplify various calculations and thus make them more accurate. The use of some nonlogarithmic transfer function may result in less sensitivity to the quantization effect and thereby may yield sufficiently faithful reproduction with still a lesser degree of definition. These refinements, however, are not essential for the perfection of a practical system.

FIGS. 3*c* and 3*d* show two additional techniques which may be employed in the filter-tube assemblies. Considering FIG. 3*c*, the reflected or direct light (reflected from or passing through the original respectively) is indicated by a ray R which impinges upon the surface of a half-silvered mirror 41 striking at an angle of 45° and being partially reflected as a ray R–1 passing through a filter 35*b* (which may be the red filter). The ray partially passed, identified as R–2, strikes a second half-silvered mirror 42 at an angle of 45° and is partially reflected and partially passed therethrough to form the rays R–3 and R–4, respectively, which pass through blue and green filters 36*b* and 37*b*, respectively.

In the alternative embodiment of FIG. 3*d*, the ray R passing either directly through a transparency or as reflected light from a print, impinges upon a dichroic mirror 43 at an angle of 45°, which mirror is adapted to reflect only red light as a ray R–1 deflected toward phototube 35. The transmitted light (which therefore contains blue and green light) is designated by ray R–2 which impinges at an angle of 45° upon a second dichroic mirror 44 adapted to reflect only blue light. The reflected light appearing as ray R–3 is deflected toward phototube 36. The transmitted light depicted as ray R–4 is directed toward phototube 37. Any of the techniques described above may be utilized in the filter-phototube assemblies, depending only upon the needs of the particular user, since each of the techniques may be employed with equal success.

FIG. 4 shows a circuit 45 utilizing a vacuum phototube 46 for converting light intensity into a digital quantity. The vacuum phototube is selected due to its stability and capability of substantially exact reproducibility after repeated operation. The vacuum phototube has the property of conducting a current which is directly and precisely in proportion to the light flux falling upon its cathode 46*a*. In this circuit the voltage developed across resistor R1 is proportional to the current through phototube 46. This voltage, in turn, is proportional to the light incident upon the phototube. At time $t$=0 the computer control circuit opens normally closed switch 47 allowing the voltage across the parallel combination of resistor R and capacitor C to decay exponentially. Whereas the switch 47, shown as being a mechanical switch and its operating means as shown as a mechanical means from control means 48, it should be understood that switch 47 may be an electronic switch controlled by a signal from control circuit 48 for opening the circuit and isolating power source E from the RC circuit. Simultaneously therewith, control circuit 48 clears digital counter 49 to set the counter to zero. Substantially simultaneously therewith, control circuit 48 opens gate 50 allowing pulses from oscillator 51 (which may be a local oscillator or may be provided in the computer) to apply its output to counter 49. When the voltage across the RC circuit is decayed to a point where it equals the phototube voltage across R1, gate 50 is closed by the output of voltage comparator 51 stopping counter 49. A digital number corresponding to the count will be proportional to the logarithm of light intensity. Mathematically, if the voltage across $R_1=KI$, where $K$ is a factor of proportionality and $I$ is the intensity of illumination, we can equate this voltage to that across the RC circuit as follows: $KI=E_o e^{1t/RC}$. Solving for $t$, the time to reach equality, we derive the equation $t=RC \cdot 1n(KI/E_o)$.

Designating $I_o=E_o/K$, the light intensity at which the phototube voltage equals the initial voltage across the RC circuit, and changing the base of logarithms from 2.7128 to 10, we find $t=0.434\, RC \log I_o/I$.

Thus, $t$ becomes a measure of density, which is the logarithm of the reciprocal of light intensity. A circuit of the type shown in FIG. 4 may be provided for each of the light filter-phototube assemblies enabling simultaneous generation of the digital signals representing light intensities for each of the primary colors. As an alternative, the circuit of FIG. 4 may be employed on a time shared basis where each individual primary color is sensed in rapid succession.

The computer employed may be programmed so as to include a capability for performing various corrections. This is a desirable system feature since the printer is very often requested by customers to make alterations in a picture or transparency to be reproduced. This may involve not only altering proportions of the red, green and blue primaries, but also the request that the proportions differ, depending upon the intensity level. It may also involve changes in luminance, color saturation or gamma.

By way of illustration, the latter, i.e., gamma correction, is accomplished by first manually inserting the coordinates of the inflection points of the Gamma correction curve, one such typical Gamma correction curve being shown in FIG. 5. The points may differ for the cyan, magenta, yellow and black signals. Whereas FIG. 5 shows only two inflection points 51 and 52 for the curve 50 of FIG. 5, any number may be included at a very modest increase in the computer program and the number of registers required for performing Gamma correction. The computer prepares a Gamma correction table. In one practical embodiment employing a PDP–8 Computer, the program required 309 words in core memory for the program and 36 registers. The Gamma correction tables, which are formatted to facilitate subsequent computer operations, occupy 384 words of core memory in the above mentioned program. The running time of the program is on the order of one second. While the program and its registers may be entered into the computer at any desired time from either a punched paper tape or card reader, for example, and whereas the program can be inputted to the computer in less than 1 minute, utilizing the above-mentioned computer it appears that there is sufficient room in core memory to retain the program within core memory at all times when the operating program for the color separation is in memory.

In one embodiment employing a PDP–8 computer the full-program for converting red, blue and green light densities measured by the filter-phototube assemblies into equivalent. densities of the cyan, magenta, yellow and black inks to form the halftone patterns, 160 words were required in core memory for the program and 20 words for registers. The color formula parameters required 3,072 words while multiplication tables and Gamma correction tables required 512 words. Thus it should be noted that there is adequate room in the 4,096 word memory for the operation, as well as for the preparation of the Gamma correction tables. Program running time for the entire program is estimated at about 500 microseconds for a set of four color dots. Operating at 133 dots per inch, a system speed for a set of four colors would be of the order of 7.0 sq. inches per minute. As one example, the preparation of the necessary halftone plates for a picture having a size 4″×6″ may be completed in less than 3½ minutes.

The technique for determining the coefficients employed in the color conversion equations and the manner in which the self-adaptive system operates will now be considered.

As was previously described with regard to FIG. 1, for example, the interface equipment 22 accepts analog signals from the three filter-photocell assemblies which individually determine the red, green and blue color densities respectively, at each point in the original picture. The interface initiates itself upon receipt of an order from the computer, converting the three colored density signals into their digital equivalents. The digital signals are then arranged in a proper format for the computer. The computer is then requested to accept the signals and transmit the signals to the proper memory addresses within the computer and thereby terminate the computer request to accept signals. Employing three parallel channels each of which includes a 10 megacycle counter of the type shown in FIG. 4, digitizing of the analog signals may be completed within 6.4 microseconds or less. An additional 6.0 microseconds depending on the type computer used, may be required to place the information in computer memory.

With regard to the computations performed upon the data, it has been shown, for example as set forth in "A Proposed Engineering Approach To Color Reproduction" a paper presented at the 14th annual meeting of the Technical Association of the graphic arts, Minneapolis Minn. June 11, 1962, by Irving Pobbaravsky, that if a given color sample is measured on a colorimeter and found to have red, green and blue colorimetric densities $Dr$, $Dg$ and $Db$, respectively, that this color can be reproduced to a satisfactory degree of fidelity by a printing process employing color inks whose Equivalent Neutral Densities (END) in cyan, magenta and yellow are $c,m,y$, respectively, by use of the conversion given by the following second order equations:

$$c=a_{11}Dr+a_{12}Dg+a_{13}Db+a_{14}D^2r+a_{15}D^2g+a_{16}D^2{}_b+a_{17}DrDg$$
$$+a_{18}DrB_b+a_{19}DgDb$$
$$m=a_{21}Dr+a_{22}Dg+a_{23}D_b+a_{24}D^2{}_r+a_{25}D^2g+a_{26}a^2{}_b$$
$$+a_{27}DrDg\,(+a_{28}DrD_b+a_{29}DgD_b)$$
$$y=a_{31}Dr+a_{32}Dg+a_{33}D_b+{}_{34}D^2{}_r+a_{35}D^2g+a_{36}D^2{}_b$$
$$+a_{37}DrDg\,(+a_{38}DrD_b+a_{39}DgD_b)$$

where the coefficients $a_{ij}$ depend on the exact nature of the inks, halftone screen ruling, paper and the printing process employed.

The coefficients can be determined for any set of conditions by printing a large number of different colors using various quantities of colorants, measuring the resultant colorimetric densities and then utilizing a regression analysis.

Whereas the solution might be best implemented by an analog computer such a computer would be rather extensive due to the large number of multiplications and additions to be performed. The regression analysis would also require another large and different computer, therefore making the use of an analog computer of questionable practicality.

Likewise, the implementation of these equations in a digital computer would be so time consuming that an intolerably long time would be required to process a single picture.

Thus, up to the present, it has not been practical to implement a scanner utilizing the Pabboravsky's equations. Practical scanners, as well as photographic methods for making color separations have been limited by practical considerations to the solution of only first order, or linear equations. The introduction of nonlinear terms, where attempted at all, has been on a highly rudimentary and approximate basis.

The subject invention combines the use of a scanner mechanism with a digital computer in a novel system which, in effect, determines and compensates for all of the distortions, nonlinear as well as linear, without the necessity for explicitly solving these very complex equations. It operates as follows:

$Dr$, $Dg$, $Db$, the colorimetric densities, are initially analog quantities. Since the accuracy of the color conversion equations set forth above is of the order of 3 percent and has been found by Pabboravsky to yield an adequate degree of fidelity, and since it is known that quantizing would produce barely visible effects in the reproduced picture if the quantum jumps were held to 3 percent, these quantities are converted to six bit digital numbers. The quantum jump for a six bit digital quantity is 1.5 percent which is well below the 3 percent accuracy of the above-mentioned equations.

The three most significant digit positions of the quantities *Dr*, *Dg*, and *Db* are identified as *Dor*, *Dog*, *Dob*, respectively, while the three least significant digit positions will be identified by D1*r*, D 1*g* and D1*b*, respectively. The values of *c*, *m*, and *y* are determined by experiment and computation for every possible value of *Dor*, *Dog* and *Dob*, which values will be denoted by *co*, *mo* and *yo* respectively. The increments in the quantities *co*, *mo*, *yo* for every possible value of *Dor*, *Dog*, and *Dob* and for unit increments in *Dog*, *Dog* and *Dob* are next determined from the values of *co*, *mo* and *yo*. These increments are designated as *cr*, *cg*, *cb*, *mr*, *mg*, *mb*, *yr*, *yg* and *yb*, respectively. New conversion equations may now be derived in the following manner:

The conversion equations are derived by taking the first two terms of a Taylor series expansion in the vicinity of *Dor*, *Dog* and *Dob*.

$$C=C_o+\left(\frac{\zeta c}{\zeta De}\right)_o(Dr-Doz)+\left(\frac{\zeta c}{\zeta Dg}\right)_o(Dg-Dog)+\left(\frac{\zeta c}{\zeta Db}\right)_o(Db-Dob)$$

$$M=M_o+\left(\frac{\zeta m}{\zeta Dr}\right)_o(Dr-Dor)+\left(\frac{\zeta m}{\zeta Dg}\right)_o(Dg-Dog)+\left(\frac{\zeta m}{\zeta Db}\right)_o(Db-Dob)$$

$$Y=Y_o+\left(\frac{\zeta y}{\zeta Dr}\right)_o(Dr-Dor)+\left(\frac{\zeta y}{\zeta Dg}\right)_o(Dg-Dog)+\left(\frac{\zeta y}{\zeta Db}\right)_o(Db-Dob)$$

Where Co, Mo, Yo, $$\left(\frac{\zeta c}{\zeta Dr}\right)_o,\left(\frac{\zeta c}{\zeta Dg}\right)_o\ldots$$

are the values of C, M, Y, $$\left(\frac{\zeta c}{\zeta Dr}\right),\left(\frac{\zeta c}{\zeta Dg}\right)\ldots$$

at the point *Dor*, *Dog*, *Dob*

Identifying $$\left(\frac{\zeta c}{\zeta Dr}\right)_o,\left(\frac{\zeta c}{\zeta D_g}\right)_o$$

etc. with *Cr*, *Cg*, etc, and (*Dr*−*Dor*), (*Dg*−*Dog*) etc. with *Dir*, *Dig*, etc., we arrive at the conversion equations:

$$C=Co+CrDir+CgDig+CbDib$$

$$M=Mo+MrDir+MgDig+MbDib$$

$$Y=Yo+YrDir+YgDg+YbDib$$

As a practical matter better printing results are obtained through the use of an additional or fourth ink which is black. There are several methods in which the above equations can be modified to provide this fourth colorant. For purposes of the present explanation, the equivalent neutral density of the fourth, or black, ink will be identified by the symbol *n* and the above equations may be rewritten as follows:

$$c=Co+C_rD_{1r}+CgD1g+C_bD1b$$

$$m=mo+m_rD1r+mgD1g+m_bD1b$$

$$y=yo+yrD1r+ygD1g+ybD1b$$

$$n=no+nrD1r+n_gD1g+N_bD1b$$

wherein *c*, *m*, *y* and *n* are expressed by six-bit numbers. As indicated previously, *Dor*, *Dog*, *Dob* are each expressed by three-bit numbers as are *D1r*, *D1g* and *D1b*. *co*, *mo*, *yo* and *no* are functions of *Dor*, *Dog* and *Dob;* they comprise a set of 2,048 six-bit numbers. $c_r$, $c_g$, $c_b$, $m_r$ ....$n_r$, $n_g$ and $n_b$ are functions of *Dor*, *Dog* and Dob. This comprises a set of 6,144 four-bit numbers (including a sign bit). The determination of these functions from experiment and computation will be described hereinbelow.

The above equations may, for example, be solved by a small computer which has a core memory capable of storing 4,096 12-bit words. Multiplication can alternatively be performed by either a high-speed arithmetic option of by table lookup, the latter being the preferred technique since sufficient memory space would be available for such a table and the extra expense of the high-speed arithmetic unit does not appear to be warranted.

In order to most efficiently utilize core memory space in the storage of the parameters used in the above equations, i.e., the quantities $c_o$, $m_o$, $y_o$, $n_o$, $c_r$, $c_g$, ....$n_g$and $n_b$, several parameters may be incorporated into a single 12-bit word. Thus the parameters $c_o$ and $m_o$ may be packed into one word and $y_o$ and $n_o$ into another. In a similar fashion the quantities $c_r$, $c_g$ and $c_b$ may be packed into a single word as well as $m_r$, $m_g$, $m_b$ and $y_r$, $y_g$, $y_b$ and $n_r$, $n_g$, $n_b$. Thus, the 3,036 12-bit words of core memory would be sufficient for storing these data. The computer processing time for solving the above equations for a single-picture cell is dependent upon the computer used and the exact way in which the program is written. However, detailed programming calculations for the PDP-8 have indicated a process time in the order of several hundred microseconds.

Considering the newly derived conversion equations set forth hereinabove a description of the manner in which the computations are performed will now be given.

The quantities $D_r$, $D_g$ and $D_b$ are, strictly speaking, the color densities. Each is equal to the logarithm of the corresponding color reflectance (or direct transmission in the case of a transparency). Likewise, *c*, *m*, *y* and *n* are the equivalent neutral densities (END) of the cyan, magenta, yellow and black inks necessary to reproduce the color in question. As a practical matter $D_r$, $D_g$ and $D_b$ may deviate from being strictly logarithmic functions and *c*, *m*, *y* and *n* may deviate from being strictly equal to the END's. These deviations, however, need be of little practical consequence if they are stable and if the coefficients of the above equations have been determined for the actual values of $D_r$, $D_g$, $D_e$, *c*, *m*, *y* and *n*.

A "closed loop" method for determining coefficients of new conversion equations will now be considered which is comprised of the following steps:

A large number of arbitrary but representative sets of *c*, *m*, *y* and *n* are chosen:

These sets will be used by the system to engrave, or otherwise prepare a set of color printing plates;

The set of plates will then be employed to print color with the same inks and presses to be used in the final production runs:

The resulting print is then scanned by the referenced system to determine the color densities $D_r$, $D_g$ and $D_b$ for each of the *c*, *m*, *y* and *n* sets; and these data will then be used to calculate the values of the coefficients employed in the new conversion equations.

Thus, except for errors due to imperfect data and the interpolation process used, the equations employing the above coefficients give substantially exact results. The errors due to imperfect data and interpolation can be minimized through the use of large number of samples and appropriate averaging techniques.

In order to obtain sufficient precision and yet be within practical boundaries for measurement and calculation, 512 arbitrary sets of *c*, *m*, *y* and *n* are selected. These are expressed by the binary digital numbers $c_1$=*xxx*000, $m_1$=*xxx*000, $y_1$=*xxx*000, where each *x* represent either a binary 1 or a binary 0. Since in actual printing practice it is preferable to reproduce grays partially by a black ink rather than entirely by equal amounts of cyan, magenta and yellow inks, a value of black ink $n_2$ is selected which is equal to some prescribed proportion, *P*, of the smallest of $c_1$, $m_1$ or $y_1$. In an equally arbitrary manner each of the quantities $c_1$, $m_1$ and $y_1$ are reduced by $n_2$. The new color $c_2=c_1-n_2, m_2=m_1-n_2, y_2=y_1-n_2, n_2$ will only roughly approximate the original color $c_1$, $m_1$, $y_1$. However, this is of no consequence since we are only attempting at this stage in the process to set up a set of colors which are more or less evenly spread across the color diagram. For ease of computation $P$ is restricted to be one of the set of eight numbers from $O$–⅞. In printing practice $p$=½, or 50 percent under color removal, is frequently chosen. The program and memory allocations for the above calculation in the PDP-8, a typical small computer, was found to be comprised of 140 instructions and 13 registers and required 1,024 12-bit words of core memory for data storage. The running time was found to be about 0.18 seconds.

Having now obtained a set of 512 arbitrary colors more or less evenly spaced in $c$, $m$, $y$ space the set of plates will now be engraved to print the colors. The layout of this print is illustrated in FIG. 9 which is comprised of a rectangular-shaped area having a total of 512 individual color blocks arranged in 16 rows and 32 columns, as shown in FIG. 9. The details of each individual color block is shown in FIG. 9*a* wherein each of the blocks 61 in the array 60 is comprised of a long black rectangular-shaped area 62, a second rectangular-shaped area 63 of shorter length and a substantially square-shaped color area 64. The first or left-hand most column 65 of the array 60 shows the manner in which the blocks 61 have the black rectangular areas 62 and 63·and the color area 64 arranged therein.

The transitions from black to white in the borders surrounding each color block are designed to indicate, when the print is scanned during a subsequent operation, transition from one color patch to another. In order to make this transition unambiguously detectable, rectilinearity of the print must be better than half the width of a border. Since this is of the order of 1.6 percent some degree of care should be exercised in the printing and remounting operations to facilitate the accuracy of the scanning operation.

Initially, the order of colors in each of the patches 64 will run through the gamut of colors $c_1$,$m_1$,$y_1$=$xxx$,$xxx$,$xxx$ as if one were counting from 000,000,000 to 111,111,111 by binary digits. If the order causes difficulties due to ink flow and distribution in the printing press, the ordering of the colors may be altered.

The program is based on the fact that the system operates in one of three major states: (1) engraving a white circumferential band, (2) engraving a black circumferential band or (3) engraving a mixed band. When in state (3) the system will also be in one of four minor states: (a) engraving a white bar, (b) engraving a color bar, (c) engraving a black bar or (d) quiescense. The identification of the state in which the system finds itself at any given moment is kept in the "state" registers of the computer. The transition from one major state to another is initiated from a "revolution count" register. The transition from one minor state to another is initiated from a "line count" register. The revolution count register is incremented by pulses inserted into the computer, which pulses are initiated by a revolution trigger on the rotating drum. The line count register is incremented by a pulse into the computer initiated by a computer clock. These functions may be performed for almost any computer by suitable interface equipment. Information to the system as to the color of the plate being engraved at any time may be provided in "color plate" registers which may be manually set at the computer console. Obviously, the plates may be either made in sequential fashion of simultaneous fashion in accordance with the embodiments of either FIG. 1 or FIG. 2, respectively.

The engraved plates which are four in number, representing the cyan, magenta, yellow and black colors are now used in a printing press with the same paper and ink used in the ultimate production process. If this is not practical, the closest approximation possible should be used. The halftone patterns of each of the four plates produce a representative color print which, after completion, is mounted, for example, upon the cylinder 26 of FIG. 2 or performance of the first scanning operation. The print, when mounted upon drum 26, should be rectilinear to better than 1.6 percent.

The print is then scanned and the measured color densities $D_r$, $D_g$, and $D_b$ for each $c_1$, $m_1$, $y_1$ set are converted into digital quantities and then transferred to computer memory. The computer program ascertains when a measurement of $D_r$, $D_g$, $D_b$ can be made and with which $c_1$, $m_1$, $y_1$ to associate the measured values at the point being scanned. The system keeps an account of what state it is in at every moment and, when it finds itself within a color patch, determines the $c_1$, $m_1$, $y_1$ set for that color patch by reference to a register in the computer in which the number of color patches through which the system has scanned is recorded. The system determines that it is in the "black column" state by examining the values of $D_r$, $D_g$ and $D_b$ at the point being scanned to see if 4, is wholly black and verifying that it stays wholly black for an entire rotation of the drum. Once in the "black column" state (i.e. when scanning the black rectangular areas 62 arranged in a column) the system will remain so until it enters the "white column" state (which is the vertically aligned white area between vertically aligned patches 62 and vertically aligned patches 63–64. Likewise, the computer determines that it is in a "white column" state by examining the $D_r$, $D_g$ and $D_b$ values for each point being scanned and finding it to be entirely white and remaining so for an entire drum rotation. Once the scanner is scanning the "while column" state it will remain there until it enters the "color column" state (the column which contains the patches 63–64).

The system will enter the "color column" state when it detects as many as 32 black bars in a single-drum revolution and subsequently counts enough revolutions of the drum to insure that the scanner is far enough into the color column area to make good measurements. The scanner will leave the "color column" state and enter into the "black column" state (i.e., the next column of black surface areas 62) when it detects a black bar longer than one thirty-second of the width of the print. The system will count the number of times it leaves the "black column" state and will automatically halt when the number reaches 33 (i.e. at the end of the picture).

When in the "color column" state the scanner will detect when it transits from a black bar to a white bar (i.e., when moving from the black bar 63 through a "white bar" toward the color area 64). After such a transition it will count the number of lines to determine when it is well within the boundaries of a color patch (i.e., near the center of a patch 64) and can thereby safely make a measurement of the $D_r$, $D_g$ and $D_b$ values of that particular color patch.

Measurements of $D_r$, $D_g$ and $D_b$ for a given value of the $c_1$, $m_1$ and $y_1$ sets are averaged in two ways: (1) the input beam diameter of the scanning beam [of either direct or reflected light] is spread to several times its normal diameter in order to obtain smooth data and to minimize dot alignment and moire effects; (2) 64 independent measurements are made for each color patch of the type shown by the numeral 64 in FIG. 9*a* and these values obtained are averaged numerically in the computer.

Using the data now in computer memory the parameters for the color formulas are then derived in the following manner:

Initially, the average value of each $D_r$, $D_g$ and $D_b$ is calculated in a manner set forth above. This is done simply by dividing the sum of 64 readings by 64. The set of average values of $D_r$, $D_g$ and $D_b$ for a given set of values of $c_1$, $m_1$ and $y_1$ are associated with the values of $c_2$, $m_2$, $y_2$ and $n_2$ which are derived from the same set of values of $c_1$, $m_1$, and $y_1$. $D_r$,$C_2$; $D_g$,$M_2$; $D_b$,$Y_2$; 00,$n_2$ are stored together at addresses determined by the appropriate values of $c_1$, $m_1$ and $y_1$.

An index is then created for the stored data. The order of the index is such that the lowest value or first quantity is that for which $D_r$, $D_g$ and $D_b$ are all 0. Next in order are the data for which $D_r$ and $D_g$ are both less than the binary number 100 (i.e. one-sixteenth of full-scale); these data are arranged in ascending order of their $D_b$ values. Next in order is the date in which $D_r$ is less than binary 100 and $D_g$ is as large as binary 100 but less than binary 1,100; these data are then arranged in descending order of the values $D_b$ and so forth.

More precisely, the binary number 100 is added to both $D_r$ and $D_g$ and the last three binary digits are dropped to form what will hereinafter be referred to as $D_{or'}$ and $D_{og'}$. $D_b$ is complemented (i.e. subtracted from the binary number 1,000,000), if the least significant digit of $D_{og}$ is binary 1 and designated as $D_{b=}$. $D_{og}$ is complemented (i.e. subtracted from the binary number 1,000), if the least significant digit of $D_{or}$ is 1 and is designated as $D_{og'}{}^*{}_=$. Finally, all of this data is packed into a single word and stored at location 0001c1m1y1. The usefulness of this index will become apparent in the next stage of the computation when data is sorted and ordered.

In the next stage, the data is sorted and put in order of ascending values of the sets $D_{or'}$, $D_{og'}{}^* D_b{}^*{}_=$, the index word. At this point we may drop all reference to $c_1$, $m_1$, $y_1$ which are now no longer needed. After placing the data in the order which makes their index words be in ascending order, the index words are no longer needed and the space which they occupy in memory may be cleared and used for other purposes.

In the next stage, the values of *c*, *m*, *y* and *n* are calculated for each of the possible sets of values of $D_{or}$, $D_{og}$ and $D_{ob}$ where, as was previously described, $D_{or}$, $D_{og}$, $D_{ob}$ are, respectively, the values of $D_r$, $D_g$ and $D_b$ with the three least significant binary bits dropped off. These values of *c*, *m*, *y* and *n* for each set are designated as $c_o$, $m_o$, $y_o$ and $n_o$, respectively. The values of the sets of $c_o$, $m_o$, $y_o$ and $n_o$ are computed for each value of the sets $D_{or}$, $D_{og}$ and $D_{ob}$ by using the information stored in core memory for the values of $c_2$, $m_2$, $y_2$ and $n_2$ for the four values of $D_r$, $D_g$ and $D_b$ "nearest" the desired $D_{or}$, $D_{og}$ and $D_{ob}$. The nearest value means that for which the difference between $D_{or}$, $D_{og}{}^* D_b{}^*$ for the point at which we are calculating the $c_o$, $m_o$, $y_o$, $n_o$ and the $D_{or}D_{og'}{}^*$, $D_b{}^*$ for the data is least. The reason for using $D_{or'}D_{og'}{}^*$, $D_b{}^*$, instead of $D_{or}$ $D_{og}$ $D_{ob}$ should be apparent. With the former, a one-bit increment to $D_{or'}$ $D_{og'}{}^*$ $D_b{}^*$ will never change the magnitude of $D_{or}$, $D_{og}$ or $D_{ob}$ by more than one binary bit.

Utilizing the 0 and first order terms of the Taylor series expansions for *c*, *m*, *y* and *n*, we obtain 16 equations of the form:

$$c_a = c_o + \frac{\zeta c}{\zeta Dr}(D_r - D_{or})_a + \frac{\zeta c}{\zeta Dg}(D_g - Dog)_a + \frac{\zeta c}{\zeta D_b}(D_b - D_{ob})_a$$

.

.

$$n_d = n_o + \frac{\zeta_n}{\zeta D_r}(D_r - D_{or})_d + \frac{\zeta_n}{\zeta Dg}(D_g - D_{og})_d + \frac{\zeta_n}{\zeta D_b}(D_b - D_{ob})_d$$

Using determinants, we derive from these the four following equations:

$$c_o = c_a\frac{\Delta bcd}{\Delta} - c_b\frac{\Delta acd}{\Delta} + c_c\frac{\Delta abd}{\Delta} - c_d\frac{\Delta abc}{\Delta}$$

.

.

$$n_o = n_a\frac{\Delta bcd}{\Delta} - n_b\frac{\Delta acd}{\Delta} + n_c\frac{\Delta abd}{\Delta} - n_d\frac{\Delta abc}{\Delta}$$

where: $\Delta bcd = (D_r - D_{or})_b\,(D_g - D_{og})_b\,(D_b - D_{ob})_b$ $(D_r - D_{or})_c\,(D_g - D_{og})_c\,(D_b - D_{ob})_c$ $(D_r - D_{or})_d\,(D_g - D_{og})_d\,(D_b - D_{ob})_d$ And: $\Delta = \Delta bcd - \Delta acd + \Delta abd - \Delta abc$ It should be noted that, in the formation of the determinants set forth hereinabove it has been tacitly assumed that the points *a*, *b*, *c* and *d* are close enough to the point $D_{or}$, $D_{og}$ and $D_{ob}$ for which the calculation is being performed so that the elements of the determinants are never greater than three-bit or, possibly occasionally, four-bit numbers. If this is not the case, an overflow will occur in the multiplication of the elements and the process will halt. Whereas a computer operator may restart the program and continue the process, the operator will be on notice that there exists a bad point for which remedial action should be taken. The occurrence of more than a few bad points indicates that the original colors selected for the color patch print were not spaced evenly enough and adjustment should be made to create a more even spacing.

In the next stage the values of $c_o$ and $m_o$ for each value of $D_{or}$, $D_{og}$, $D_{ob}$ are packed into one 12-bit word and the values of $y_o$ and $n_o$ are packed into another 12-bit word. These words are stored in memory at addresses corresponding to $01D_{or}D_{og}$-$D_{ob}0$ and $01D_{or}D_{og}D_{ob}1$, respectively. The data $D_rC_2$, $Dgm_2$, $D_b112$ and $oon_2$ stored in memory locations 1*xx,xxx,xxx,xxx* (where *x* is either binary 0 or binary 1) are no longer needed and these memory locations can be used for other purposes.

In the final stage, the quantities $c_r$, $c_g$, $c_b$, $m_r$, $m_g$, $m_b$, $y_r$, $y_g$, $y_b$, $n_r$, $n_g$ and $n_b$ are computed for all possible values of $D_{or}D_{og}$ $Do_b$. These quantities are the coefficients in the color conversion equations set forth above. From the cited equations, and recognizing that the coefficients are functions of $D_{or}D_{og}D_{ob}$, the following expression may be derived:

*cr*(*Dor*,*Dog*,*Dob*)=*co*(*Dor*+1,*Dog*,*Dob*)−*co*(*Dor*,*Dog*,*Dob*)

*cg*(*Dor*,*Dog*,*Dob*)=*co*(*Dor*,*Dog*+1,*Dob*)−*co*(*Dor*,*Dog*,*Dob*)

.

.

.

*nb*(*Dor*,*Dog*,*Dob*)=*no*(*Dor*,*Dog*,*D0b*+1)−*no*(*Dor*,*Dog*,*Dob*)

These values of the coefficients are then packed and stored in core memory. Upon the completion of the last stage, all of the coefficients of the color equations have been determined and stored in the proper places in core memory and the system is now ready to produce color-separation half-tone plates from original continuous-tone material.

The following table summarizes the core memory requirements in a small computer such as the PDP-8 for the several major steps in determining the coefficients for the color conversion equations:

| | Registers | Program | Data Storage |
|---|---|---|---|
| Generate *c*1, *m*1, *l* | 13 | 139 | 1024 |
| Convert to *c*2, *m*2, *y*2, *n*2 | | | |
| Engrave color array | 28 | 179 | 1024 |
| Analyze print | 37 | 257 | 2048 |
| Average and pack data | 14 | 149 | 2560 |
| Derivation of *co*, *mo*, *yo*, *no* | 93 | 448 | 3072 |
| Form *cr*, *cg*, ....,*ng*, *nb* | 23 | 109 | 3072 |
| Pack and store | | | |

Since there is no looping back of the computer program from one major step to a previous one, it is perfectly practical to read into core storage the registers and program needed for each major step as required. It can thus be found that data storage requires at most 3,072 words of core memory while registers and program together requires at most 541 words.

Briefly, summarizing the above computational and method steps the operation thus occurs as follows:

A large number (100 or more) of representative sets each containing a value *c*, *m*, *y* and *n* are chosen. These data are utilized to form the four printing plates for each of the colors cyan, magenta, yellow and black. The specific inks, printing process and paper to be used in the final reproduction process are then employed in conjunction with the plates specified above for printing a color array of the type shown in FIG. 9, with each of the blocks of the array shown in FIG. 9 containing two black patches and one color patch arranged in each block in the manner shown in FIG. 9*a*. After printing of a color array in the manner designated, the color array is inserted into the scanning device which may be similar to those shown in FIG. 1 or FIG. 2 for the purpose of determining the color densities $D_rD_gD_b$ for each of the designated sets of values *c*, *m*, *y* and *n*. After rearrangement and calculation a table is prepared which lists, for a large number of color densities the values of engraving signals for the cyan, magenta, yellow and black plates. In addition, another table is prepared listing interpolation coefficients for the preceding table. These tables implicitly include all effects such as the color characteristics of the inks and the nonlinearities of the photographic and printing processes. A transparency or print which is to be reproduced may now be placed into the scanning system for the purpose of preparing the four necessary half-tone printing plates utilized to reproduce the original picture (or transparency). In the scanning process the color densities are measured for each point and, for each set of color densities so measured, the tables are used to determine the engraving signals for each of the four printing plates. Finally, each point on the four printing plates is engraved in accordance with the engraving signals so determined.

FIGS. 6a and 6b depict an engraving head assembly 90 comprised of a laminated iron stater 91, a laminated iron armature 92 and an electric coil 95 for energizing the magnetic loop.

The maximum thickness of the laminations is determined by the depth of penetration of the magnetic field into the iron under pulsed conditions. The calculations indicate that for a pulse of 35 microseconds duration the lamination thickness should be of the order of 0.005 inch.

The armature 92 is substantially a wedge-shaped fitting between two diagonally aligned pole faces each of which form an angle $\theta$ at the horizontal direction in order to optimize acceleration of the armature in the downward vertical direction as shown by arrow A. The optimum value of $\theta$ can be found from the equation $\tan^3 \theta_o - \tan \theta_o = 2(h/a)$ where $\theta_o$ is the optimum value of $\theta$, $a$ = the armature length at the apex in centimeters and $h$ = the height of the armature in centimeters. The value of $\theta_o$ varies in the range from 50°–80° while the ratio of $a/h$ varies in the range from 4:1 down to 1:100, respectively. For example, at a ratio of $a/h=1/1$, $\theta_o=56.5°$. The tip 92a of the cutter has a triangular shape so as to cut or engrave away a hole of greater diameter as the cutter point penetrates deeper into the surface to be engraved.

While the engraving head will receive a pulse of approximately 35 microsecond duration, the cutting head because of its inertia will take a longer time than this to penetrate the recording material to a suitable depth. Moreover, after the head has penetrated sufficiently a spring should be used to restore the engraving head to its original position. Through calculation it has been estimated that the appropriate spring for returning the cutting head after it has made a sufficient penetration would be such that the period of motion of the engraving head would be of the order of 300 microseconds. Thus the engraving period would be one-half this duration or about 150 microseconds. It follows that the number of dots which may be engraved per unit time could be about 6,700 dots per second. If there are 17,500 dots per square inch, for a 133 line per inch screen, then the time to engrave a square inch is of the order of 2.6 seconds and the time to engrave a 4.5×7.5-inch page is 1.4 minutes for monochrome and 5.6 minutes for color presupposing the plates to be engraved are cut in sequential fashion. Obviously, if the plates for color are engraved simultaneously the engraving operation will be completed within the 1.4 minute time period.

FIG. 7 shows a spring arrangement for restoring the cutter and its associated armature to its rest position prior to the next engraving operation. The arrangement of FIG. 7 includes the armature 92 having secured thereto the tapered engraving head 92a. A pair of end blocks 94 and 95 which are fixedly secured to stater 91 by any suitable means (not shown for purposes of simplicity) secure first ends of springs 96a–96b and 97a–97b respectively whose opposite ends are secured to armature 92 for resiliently mounting the armature and its cutting head relative to the end blocks 94 and 95 and hence relative to the stator 91. For springs which are comprised of cylindrical-shaped phosphor bronze wires having a length $l$ and a diameter $d$ the necessary restoring force is provided when the length of the individual spring members are of the order of one-fourth inch and the diameter is of the order of 0.019 inch which is the equivalent of number 24 gauge wire. Such springs will have the necessary restorative forces as well as having the capability resisting tangential cutting forces imposed upon the engraving head and its armature.

FIG. 8 shows a driving circuit 100 suitable for energizing the stator coil 93 upon receiving the analog impulse signal from the digital to analog converting circuit. A supply voltage of 15 volts is estimated to be sufficient to drive an engraving head coil having an inductance of the order of 30 microhenries.

The engraving head is moved in the engraving direction, shown by arrow A in FIG. 6a. Some time after termination of this pulse the spring assemblies will restore the engraving head and armature to the original position. However, in moving toward the original or rest positions the kinetic energy of the armature and engraving head will cause them to move past the rest position. For this reason, it is preferred to provide a snubber to absorb the energy of the armature at the completion of its stroke. At the moment the armature returns to the zero or rest position it nevertheless has a considerable velocity which would tend to carry it beyond the zero position.

A suitable method for arresting this motion at the zero position is by providing an elastic collision with a mass equal in magnitude to the mass of the armature. The second mass, namely that of the snubber, will then take on a velocity equal to that of the armature before the collision. The energy of the snubber must then be dissipated within a half-cycle of the armature period so that the snubber can be brought back to its original position in readiness to arrest the next overshoot of the armature by suitable damping means. One preferred design for the snubber arrangement is shown in FIG. 7a wherein the snubber is mounted between end block 94 and 95 which are integrally joined to one another by a yoke portion 94a having a suitable aperture 94b. The snubber is comprised of a cylindrical-shaped member 98 surrounded by a hollow tubular section of viscous material 99. Cylindrical-shaped member 98 is widened and flattened at its ends to form heads 98a and 98b which secure tubular section 99 thereto. The bottom head 98b is resiliently secured to end blocks 94, 95 by two additional spring members 100 and 101 which hold the snubber in close proximity to the armature when in its rest position. The section of viscous material 99 may be force-fitted within the metallic collar 102 may be integrally formed with yoke 94a or secured thereto in any other suitable manner. The stiffness of springs 100 and 101 and the damping coefficient of the section of viscous material is chosen so that the mass 98 will be substantially brought to its rest position and have a substantially zero velocity within a time equal to half the period of oscillation of the armature. Since a required accuracy of the engraving head is of the order of 3 percent, the snubber mass should be brought to within about 3 percent of its rest position and 3 percent of its initial velocity. In one suitable embodiment, it has been found that a cylinder of aluminum having a length of 0.25 centimeters and a diameter of 0.15 centimeter and a viscous material having a thickness of 1 mil covering the cylindrical surface yields a proper damping if the viscosity is of the order of 225 poise. Springs similar to that utilized to resiliently mount the armature and of a length of one-eighth inch and diameter of 0.014 inch (i.e. 27 gauge wire) were also found to be satisfactory for this embodiment.

It can therefore be seen from the foregoing description that the present invention provides a novel method and apparatus for reproducing either color or monochrome originals wherein all controllable variables are automatically and exactly taken into account to assure extremely high fidelity reproduction of the original through the application of a precise arrangement having substantially high operating speeds as compared with conventional techniques and devices.

Although there has been described a preferred embodiment of this novel invention, many variations and modifications will now be apparent to those skilled in the art. Therefore, this invention is to be limited not by the specific disclosure herein, but only by the appending claims.

The embodiments of the invention in which an exclusive privilege or property is claimed are defined as follows:

1. A method for reproducing half-tone reproductions of either original prints or transparencies comprising the steps of:

forming an index of a large number of arbitrary colors scattered throughout the visible color spectrum and containing selected proportions of a plurality of different colored inks whereby the proportion of each colored ink of said arbitrary colors may be any value between 0 and 100 percent;

producing a first set of plates, one for each of said colored inks and each having an array of blocks arranged in matrix fashion wherein each of said blocks is engraved in a manner representative of the selected proportion of the said colored ink required for an associated one of said number of arbitrary colors; forming a print through the use of said plates to form a color array of said blocks wherein each block contains the resultant color specified by said index;

scanning the print on a point-by-point basis to determine the density of each primary color present in each of said blocks;

associating the color densities of each primary color with the proportions of individual colored inks for each block;

determining the values of the coefficients of the color conversion relationship between primary colors and colored ink proportions as determined from the print;

point-by-point scanning a print or transparency to be reproduced to determine the color densities of each primary color present at each point scanned;

converting these primary color densities into proportions of colored ink utilizing said coefficients;

forming a second set of plates, one for each ink color, engraved to the colored ink proportions at each point;

and producing a final print using said second set of plates employing substantially the same inks, printing process and paper employed in producing the color array print to thereby reproduce the original picture with excellent color fidelity.

2. Apparatus for reproducing an original color picture comprising:

first rotatable means for receiving said original picture;

second means arranged to move in a linear path parallel to the central axis of said first rotatable means and positioned adjacent said first means for scanning said picture point by point and line by line;

said apparatus being characterized by providing third digital computation means for generating and storing a plurality of color sets each comprised of selected amounts of the colored inks to be utilized in the printing process, said information being stored in the form of digital data;

a plurality of plates adapted to be mounted individually, in sequence, or simultaneously upon said first means;

fourth means linearly movable along said first means at the speed of said second means for altering each of said plates in accordance with the color densities stored in said third means to enable printing of a plurality of color patches by said plates;

said second means including fifth means for measuring the color density of each primary color at each point scanned;

said third means including sixth means for modifying the stored digital data in accordance with the measurements of said fifth means to convert the primary color densities at each point scanned into an equivalent group of signals representing the amounts of colored inks to be used n the final printing operation;

a second set of plates adapted to be mounted upon said first means;

said fourth means being operated under control of said sixth means for converting the signals associated with each scanned point received from said fifth means, for altering a corresponding point on each of said second sets of plates wherein the alteration of each plate represents the proportion of one of said colored inks to be printed to thereby produce a set of plates for employment in the final printing process whereby the original picture is produced.

3. The apparatus of claim 2 wherein said plate is a plastic or metallic member;

said fourth means including means for engraving said metallic or plastic member at each point on said member corresponding to points scanned in said original picture wherein the point engraved has a depth and diameter representative of the density of colored ink associated with said plate to be printed at each point.

4. The apparatus of claim 2 wherein said plate is comprised of a clear plastic sheet having an opaque coating;

said fourth means including means for engraving away a portion of said opaque coating at points corresponding to the points scanned on said original picture wherein the size of the area engraved at each point is representative of the density of the colored ink associated with said plate to be printed at each scanned point.

5. The apparatus of claim 2 wherein said plate is a sheet of unexposed photographic film;

said fourth means including eighth means for generating a light beam having an area, intensity and/or time duration controlled by the magnitude of said signals for exposing said film at points corresponding to scanned points of said original picture wherein the degree of exposure is representative of the density of the colored ink to be printed at each point of the reproduced print.

6. The apparatus of claim 5 wherein said eighth means is comprised of electron beam light-generating means whose beam area, intensity and/or time duration is modulated by the magnitude said signals.

7. The apparatus of claim 6 wherein said third means includes means for adding a deviation in the deflection of said fourth means for the altering operation to offset each point altered in said plate by an amount relative to its corresponding scanned point on said original picture which changes from point to point to minimize moire.

8. The apparatus of claim 2 wherein said third means includes means for inserting a random delay in the energization of said fourth means for the altering operation to offset each point altered in said plate by a random amount relative to its corresponding scanned point on said original picture to minimize moire.

9. The apparatus of claim 2 wherein said fifth means is comprised of a light beam source for impinging a first beam upon the surface of said picture;

at least one filter of a selected primary color positioned to pass only light of the primary color passed by said filter-phototube means positioned to receive light passed by said filter for generating an analog signal representative of the density of the selected primary color at the point being scanned by said light beam;

plural means each being connected to an associated one of said phototube means for converting said analog signal into a digital signal representative of the magnitude of said analog signal.

10. The apparatus of claim 2 wherein said fifth means is comprised of a light beam source for impinging a first beam upon the surface of said picture;

means positioned to receive said first light beam after it has impinged upon the surface of said picture for splitting said first light beam into three beams, one for each of the primary colors contained within the pint being scanned;

separate phototube means each being positioned to intercept an associated one of said three beams for generating an analog signal representative of the density of the selected primary color at the point being scanned by said light beam;

means for converting said analog signal into a digital signal representative of the magnitude of said analog signal.

11. A method for producing reproductions of an original color picture comprising the steps of:
printing a color array upon a sheet wherein said color array is comprised of a plurality of uniform size blocks arranged in a regular matrix;
each of said blocks containing a selected color comprised of a plurality of different colored inks, pigments or dyes of selected proportions, each of said selected colors being different from other colors in said array wherein the densities of the colors employed may vary in value between 0 and 100 percent;
examining each block in said color array to determine the amount of each primary color in each block;
determining the conversion factors relating the amount of colored ink, pigment or dye to be used to obtain any desired color;
scanning point by point the original picture to be reproduced to determine the amounts of each primary color present at each point being scanned;
converting these measured primary color amounts at each point scanned into the colored ink, pigment or dye quantities which would reproduce the scanned color through the use of the conversion factors previously determined;
utilizing these colored ink, pigment or dye quantities to prepare plates, one for each color, each of said plates being prepared to deposit at each point the quantity of colored ink, pigment or dye required for reproducing at each point the desired resultant color;
laying down each colored ink, pigment or dye specified on sheets using the plate associated with each colored ink, pigment or dye wherein the inks, pigment or dyes, sheets and printing process employed in forming the reproduction of the original picture are substantially the same as those employed in printing the color array.

12. A method of producing reproductions of an original color scene comprising the steps of:
generating a plurality of sets of reproduction signals;
fabricating a color array upon a sheet wherein said color array is comprised of a plurality of blocks arranged in a regular matrix;
each of said blocks being composed of a set of colored inks, pigments or dyes, the proportions of said set being in accordance with one of said sets of reproduction signals, the resultant color of each of said blocks being different from the color of other blocks in said array and the densities of said colors in each set varying between 0 and 100 percent;
examining each block in said color array to determine a tristimulus color value for each block;
associating the said tristimulus value of color for each of said blocks with the related set of said reproduction signals, thereby creating a first table of tristimulus color values resulting from the said plurality of sets of reproduction signals;
reverting said first table to produce a second table or reproduction signals for the production of desired tristimulus values of color;
operating upon said second table of reproduction signals to produce a third table of interpolation coefficients for said second table;
examining a color scene point by point by the same means as used in examining the blocks in said color array to determine tristimulus color values for each point;
using said second and third tables to determine a set of reproduction signals for each point of said scene;
using said reproduction signals to make a reproduction of said scene point by point.

13. A matrix for use in reproducing colored images which is employed in computer-operated scanning systems for the purpose of equating tristimulus values to the quantities controlling the colors necessary to print reproductions of substantially the exact colors of the original color images, said matrix comprising:
a sheet having a plurality of color patches arranged in a regular matrix fashion of $m$ rows and $n$ columns where $m$ and $n$ are real integers;
each column of patches being preceded by an area in which there is at least one change in color or intensity;
each row of patches being preceded by an area in which there is at least one distinctive change in color intensity;
the color patch boundary being spaced from the abovementioned distinctive change by a determine amount.

14. A system for scanning a color matrix of the type described in claim 13 comprising:
first means for examining the color patches of said matrix to generate signals representative of the tristimulus values in each color patch;
second means for moving said first means relative to said matrix to cause said matrix to be scanned in a regular fashion column by column and row by row;
third means coupled to said first means for processing said tristimulus values;
fourth means coupled to said first means for inhibiting said first means from transferring tristimulus values unless said second means has placed matrix into a position where first means can examine a color patch;
said fourth means further including fifth means for detecting the distinctive change in color or intensity in the areas preceding the color patch columns and rows;
said fifth means including delay means for inhibiting said first means for a period after detection of said distinctive change which is of a duration sufficient to indicate that the scanning means is passing over a color patch before said tristimulus values are transferred to said third means.

15. The system of claim 4 further comprising means coupled to said first means for counting the number of times said fourth means generates a count of $m$ to indicate a termination of said scanning process when said fourth means generates a count of $m$, $n$ times.

16. A method for producing color reproduction of an original color image comprising the steps of:
a. forming a large number of arbitrary sets of colorants each comprised of values of $c$, $m$, $y$ and $n$, respectively, representing the colorants cyan, magenta, yellow and black or a neutral color wherein the densities of $c$, $y$, $m$ and $n$ may be any value between 0 and 100 percent;
b. printing each of said arbitrary sets as separate patches of color on a sheet employing the same colorants as will be used in the final printing operation;
c. scanning each patch of color to determine the color densities $D_r$, $D_g$ and $D_b$ of each patch wherein $D_r$, $D_g$ and $D_b$ are the density values of the primary colors, red, green and blue;
d. utilizing the values of $c$, $m$, $y$ and $n$ for each color patch and the related measured values of $D_r$, $D_g$ and $D_b$ whereby values of $c$, $m$, $y$ and $n$ may be determined for any possible set of $D_r$, $D_g$, $D_b$;
e. scanning the image to be reproduced on a point by point basis to obtain the values of $D_r$, $D_g$ and $D_b$ for each scanned point;
selecting the appropriate set of $c$, $m$, $y$ and $n$ associated with the values $D_r$, $D_g$ and $D_b$ obtained for each point;
f. producing plates for each colorant ($c$, $m$, $y$ and $n$representative of the $c$, $m$, $y$ and $n$ density values respectively;
g. printing the reproduction by using the produced plates with their associated colorants.

17. The method of claim 16 wherein step ($c$) further comprises the steps of scanning each color patch on a point by point basis to obtain a large number (N) of readings of the values $D_r$, $D_g$ and $D_b$ for each color patch;
summing the readings obtained for each color patch and dividing the number (N) of readings to obtain an average value;
associating the average values $c$, $m$, $y$ and $n$ for the associated color patch.

UNITED STATES PATENT AND TRADEMARK OFFICE

CERTIFICATE OF CORRECTION

PATENT NO. : 3,612,753

DATED : 12 October 1971

INVENTOR(S) : Nathaniel I. Korman

It is certified that error appears in the above-identified patent and that said Letters Patent are hereby corrected as shown below:

Column 22, line 32 - change "4" to -- 14 --.

Signed and Sealed this

*Thirteenth* Day of *September 1977*

[SEAL]

*Attest:*

RUTH C. MASON
*Attesting Officer*

LUTRELLE F. PARKER
*Acting Commissioner of Patents and Trademarks*